(12) United States Patent
Li et al.

(10) Patent No.: US 12,189,857 B2
(45) Date of Patent: Jan. 7, 2025

(54) ADJUSTING HAPTIC RENDERING BASED ON CONTEXTUAL AWARENESS

(71) Applicant: QUALCOMM Incorporated, San Diego, CA (US)

(72) Inventors: Muhua Li, San Diego, CA (US); Wesley James Holland, Encinitas, CA (US); Ajit Chourasia, San Diego, CA (US); An Chen, San Diego, CA (US); Vijaya Datta Mayyuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/821,100

(22) Filed: Aug. 19, 2022

(65) Prior Publication Data

US 2024/0061505 A1 Feb. 22, 2024

(51) Int. Cl.
*H04B 3/38* (2006.01)
*G06F 3/01* (2006.01)
*G06F 3/16* (2006.01)

(52) U.S. Cl.
CPC ............... *G06F 3/016* (2013.01); *G06F 3/16* (2013.01)

(58) Field of Classification Search
CPC ....... G06F 3/016; G06F 3/16; H04M 1/72454
See application file for complete search history.

(56) References Cited

U.S. PATENT DOCUMENTS

| | | | |
|---|---|---|---|
| 9,963,068 B2 * | 5/2018 | Hada | B60N 2/0244 |
| 10,059,228 B1 * | 8/2018 | Aikin | B60N 2/42727 |
| 10,377,307 B2 * | 8/2019 | Hada | B60G 17/0162 |
| 10,586,369 B1 * | 3/2020 | Roche | G10L 13/00 |
| 2016/0062466 A1 | 3/2016 | Moussette et al. | |

OTHER PUBLICATIONS

International Search Report and Written Opinion—PCT/US2023/071917—ISA/EPO—Oct. 25, 2023.

* cited by examiner

*Primary Examiner* — Toan N Pham
(74) *Attorney, Agent, or Firm* — QUALCOMM Incorporated

(57) ABSTRACT

Disclosed are systems, apparatuses, processes, and computer-readable media to provide haptic feedback in electronic devices based on contextual awareness. According to some aspects, a method of controlling haptic feedback includes obtaining environmental information indicative of an environment of a computing device from at least one sensor and determining a context associated with the mobile device based on the environmental information. The method may include determining haptic feedback for output by the mobile device based on the context.

30 Claims, 10 Drawing Sheets

ADJUSTING HAPTIC RENDERING BASED ON CONTEXTUAL AWARENESS

FIELD

The present disclosure generally relates to haptic rendering or feedback for electronic devices. For example, aspects of the present disclosure relate systems and techniques for providing adjustments to haptic rendering or feedback for electronic devices based on contextual awareness.

BACKGROUND

Multimedia systems are widely deployed to provide various types of multimedia communication content such as voice, video, packet data, messaging, broadcast, and so on. These multimedia systems may be capable of processing, storage, generation, manipulation, and rendition of multimedia information. Examples of multimedia systems include mobile devices, game devices, entertainment systems, information systems, virtual reality systems, model and simulation systems, and so on. These systems may employ a combination of hardware and software technologies to support the processing, storage, generation, manipulation, and rendition of multimedia information, for example, client devices, capture devices, storage devices, communication networks, computer systems, and display devices. In some cases, these devices may be configured with a haptic actuator or other mechanism to provide haptic feedback to a user, for example, alerts, notifications, or user feedback when using an application. The devices may also be configured with additional haptic actuators to improve user experience. Multimedia systems may also be configured with additional haptic feedback to improve user experience.

SUMMARY

Systems and techniques are described for controlling (e.g., adjusting) haptic feedback in electronic devices. In some aspects, the systems and techniques can control haptic feedback in the electronic devices based on contextual awareness. According to at least one example, a method is provided for controlling haptic feedback. The method includes: obtaining environmental information indicative of an environment of a computing device from at least one sensor; determining a context associated with the computing device based on the environmental information; and determining haptic feedback for output by the computing device based on the context.

In another example, an apparatus for controlling haptic feedback is provided that includes at least one memory and at least one processor (e.g., configured in circuitry) coupled to the at least one memory. The at least one processor is configured to: obtain environmental information indicative of an environment of a computing device from at least one sensor; determine a context associated with the computing device based on the environmental information; and determine haptic feedback for output by the computing device based on the context.

In another example, a non-transitory computer-readable medium is provided that has stored thereon instructions that, when executed by one or more processors, cause the one or more processors to: obtain environmental information indicative of an environment of a computing device from at least one sensor; determine a context associated with the computing device based on the environmental information; and determine haptic feedback for output by the computing device based on the context.

In another example, an apparatus for controlling haptic feedback is provided. The apparatus includes: means for obtaining environmental information indicative of an environment of a computing device from at least one sensor; means for determining a context associated with the computing device based on the environmental information; and means for determining haptic feedback for output by the computing device based on the context.

In some aspects, the apparatus is, is part of, and/or includes a wearable device, an extended reality (XR) device (e.g., a virtual reality (VR) device, an augmented reality (AR) device, or a mixed reality (MR) device), a head-mounted device (HMD) device, a wireless communication device, a mobile device (e.g., a mobile telephone and/or mobile handset and/or so-called "smartphone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensors).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
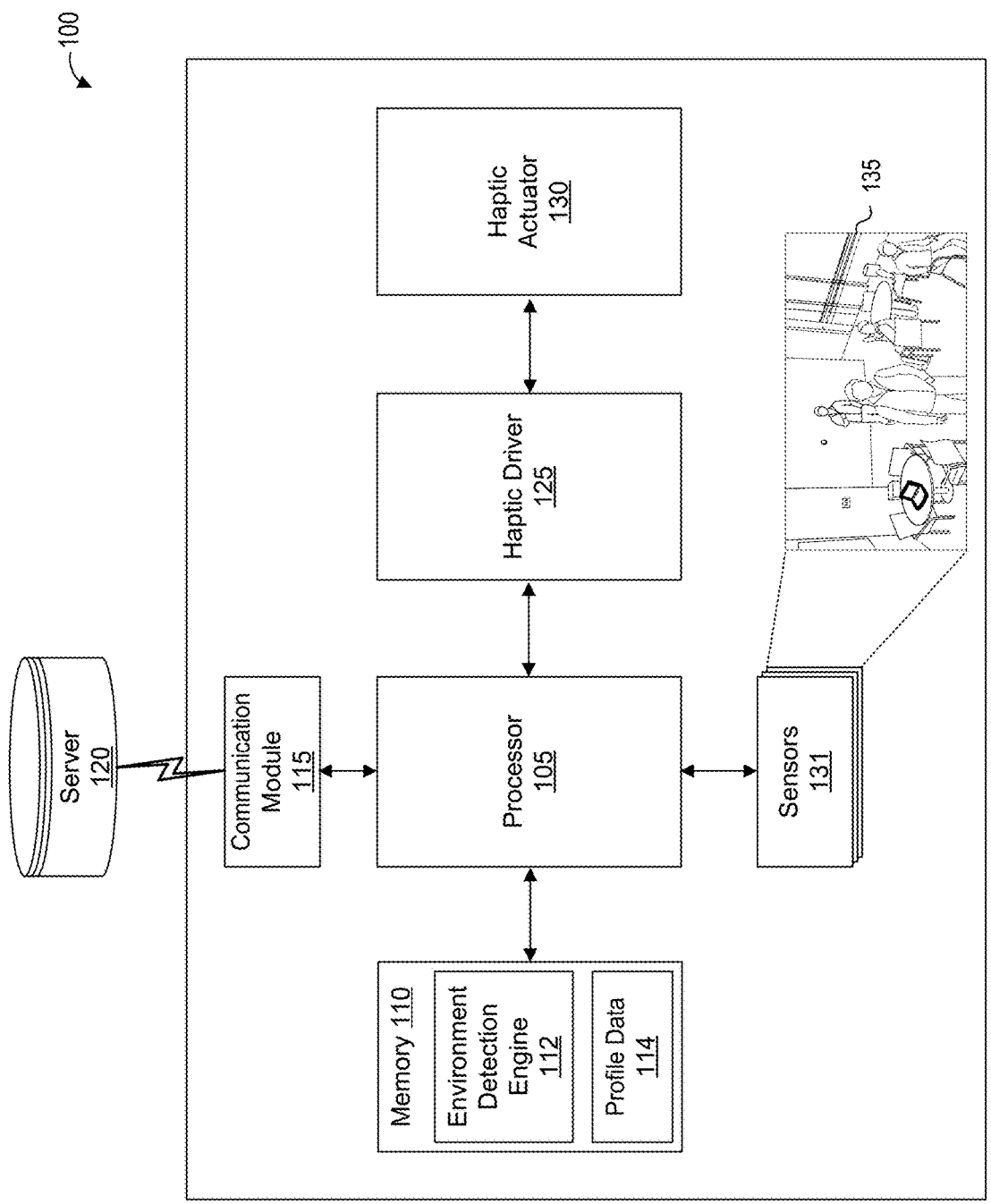
FIG. 1 illustrates a block diagram of an electronic device configured to determine a context of an environment and adjust haptic feedback in accordance with some aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The ensuing description provides example aspects only and is not intended to limit the scope, applicability, or configuration of the disclosure. Rather, the ensuing description of the exemplary aspects will provide those skilled in the art with an enabling description for implementing an aspect of the disclosure. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Different types of computing devices can include a haptic feedback device. Haptics refers to the use of technology that stimulates the senses of touch and motion (e.g., the study or use of tactile sensations and the sense of touch) as a method of interacting with computers and electronic devices. For example, a wireless game system, a mobile device including a cellular communication module, a game controller, a music instrument, a wearable device, and a head-mounted device (HMD) can include a haptic actuator that is selectively engaged to vibrate the corresponding device. In another illustrative example, a computing device can activate the haptic actuator to cause the device to provide a physical vibration and provide a notification or other feedback. In one illustrative example, a mobile communication device can receive a message (e.g., an email, a text message, etc.) and be configured to provide an audible notification and/or a physical notification based on the vibrations associated with the haptic feedback. Some applications, such as a game, can cause the computing device to activate the haptic actuator on a regular basis to improve the user experience.

In one illustrative example, some electronic devices (e.g., game controllers etc.) include an eccentric rotating mass (ERM) vibration motor to produce a vibration or rumble, such as to indicate that the player had driven off of the road in a virtual racing game, to indicate that the player had been hit in a first-person shooter game, etc. Some computing devices and other consumer electronics devices may use linear resonant actuators (LRAs) for haptic feedback. An LRA is an electromechanical device that vibrates to provide tactile feedback by driving a coil that moves a spring-mounted magnetic mass back and forth to produce a vibration. Similar to a speaker, the input to the LRA is a sine wave, which "drives" the mass into vibration. The vibration amplitude (displacement of the mass) can be affected by the peak-to-peak input voltage of the sine wave.

In some cases, a haptic actuator is intended to provide a silent notification in place of an audible notification. However, the haptic feedback function is not silent and a portion of the energy transfers to acoustic energy that is emitted from the device. For example, a person playing a game with a controller can receive persistent haptic feedback events that are associated with an event in the application that causes the haptic actuator to engage. In some cases, the haptic actuator is an audible buzz that can be audibly perceived by others nearby, especially in low ambient noise environments such as a library. Persistent audible buzzes from a haptic actuator can be distracting and can ruin the enjoyment of low ambient noise environments.

Applications can be configured to selectively enable or disable haptic feedback using various mechanisms. For example, a game can have an in-game setting that disables haptic feedback, while some applications such as a messaging application may have a setting that is configured from a central location such as a settings application of the operating system. While users may control various settings such as a do not disturb mode that silences many notifications, the notifications may still be output via haptic feedback. When a person transitions between different types of spaces (e.g., a shared transportation space to a library), the person may forget to reconfigure the haptic feedback settings and the current settings may be disruptive based on the context of the current environment. It is inconvenient for a user to manually adjust settings associated with applications based on the environment, as changing the settings (e.g., haptic feedback settings) takes time and effort.

As an illustrated example, a person may be located in a low ambient noise environment such as a library (e.g., having an ambient noise of approximately 40 decibels (dB)) and may begin to play a game having a setting for strength of haptic feedback. If the user is also wearing headphones listening to audio of the game or audio from another source, the user may be unaware of the amount of noise being emitted by haptic feedback while playing that game. Because the noise emitted by the haptic feedback, which is a buzzing sound, is repetitive and being emitted on an irregular schedule, other people near the user may be disturbed by the haptic feedback. In other scenarios, the strength of the haptic feedback may be increased based on a context to increase immersion.

In some aspects, systems, apparatuses, processes (also referred to as methods), and computer-readable media (collectively referred to herein as "systems and techniques") are described herein for context-aware haptic feedback control. For instance, an electronic device that includes one or more mechanisms for providing haptic feedback can obtain environmental information indicative of an environment of a computing device. For instance, the environmental information can be obtained from at least one sensor of the electronic device and/or from at least one sensor of another device. The environmental information can include various types of information, such as audio of the environment (e.g., obtained via a microphone), images of the environment (e.g., obtained via one or more image sensors or cameras), luminance from the environment (e.g., obtained via one or more light sensors, image sensors or cameras, etc.), wireless information associated with one or more objects or devices (e.g., radio wireless communication indicative of a presence of one or more nearby persons with wireless devices), etc.

The electronic device can use the environmental information to understand the environment. For example, the electronic device can determine a context associated with the computing device based on the environmental information and can determine haptic feedback of the computing device based on the context. In some aspects, the electronic device can include an artificial intelligence (AI) model (e.g., one or more machine learning models, such as one or more neural networks) configured or trained to understand the context of the computing device based on the environmental information.

In one illustrative example, the electronic device can be configured to determine an amount of noise associated with haptic feedback that an application will emit during the execution of the application. For instance, based on an identified context associated with the amount of noise, the electronic device may determine that the haptic feedback of the application may exceed a noise ceiling that is suitable for the context of the electronic device and can reduce haptic feedback based on the application. In another illustrative example, the electronic device can identify a shared experience with a spectator and can increase the haptic feedback to increase the spectator's engagement with the experience.

Additional details and aspects of the present disclosure are described in more detail below with respect to the figures.

FIG. 1 illustrates a block diagram of an electronic device 100 configured to determine a context of an environment and adjust haptic feedback in accordance with some aspects of the disclosure. The electronic device 100 includes a processor 105 connected to a memory 110 that stores various data and applications. In one illustrative aspect, the memory 110 stores an environment detection engine 112 and profile data 114. The environment detection engine 112 can include one or more components to implement haptic feedback adjustment. In an illustrative example, the environment detection engine 112 can include software instructions that can be executed by the processor 105. The software instructions can be implemented to determine an ambient noise level and control haptic feedback based on the ambient noise. In some aspects, the environment detection engine 112 can include or implement an artificial intelligence (AI) model, such as a machine learning (ML) model that performs predictive analytics and other learned analyses. An example of a learned analysis includes a contextual speech recognition that identifies a context of speech (e.g., whisper, presentation, meeting, etc.). The processor 105 is configured to control a communication engine 115 to send and receive data from an external source. One example of an external source is a cloud system 120 configured to send and receive data from the electronic device 100. In one illustrative example, the cloud system 120 is configured to receive anonymized data from the electronic device 100 to train AI models (e.g., an AI or ML model of the environment detection engine 112).

In another illustrative aspect, the environment detection engine 112 can be configured to detect various spectral qualities that can be indicative of the environment. Non-limiting examples of spectral qualities include harmonic information and noise type. In one example, a type of noise (e.g., grey noise, brown noise, pink noise, white noise, etc.) can indicate properties associated with an environment. For example, grey noise includes random noise having a frequency spectrum that follows an equal-loudness contour and can correspond to noise associated with air conditioners, fans, and so forth. A grey noise can indicate lack of human speech.

The processor 105 is also connected to a haptic driver 125 that is configured to actuate and control a haptic actuator 130. An example haptic driver 125 is further configured with reference to FIG. 6. In one illustrative aspect, the electronic device 100 includes one or more sensors 131 that are configured to detect an environment 135 of the computing device. Non-limiting examples of sensor(s) 131 include an image sensor, a photosensor configured to detect luminance of the environment, a microphone configured to record aural information, an infrared (IR) sensor, a light ranging and detection (LIDAR) sensor, an ultrasonic sensor, an atmospheric sensor, a pressure sensor, and a location sensor. Other sensors can be included and sensors may be omitted based on the primary function of the electronic device 100. As an illustrative example, the electronic device 100 may be a gaming system that includes a microphone and a photosensor, or the electronic device 100 may be a mobile wireless communication device for voice or text communication and includes each sensor.

In some aspects, the sensor(s) 131 are configured to obtain different types of environmental data and provide the environmental data to the processor 105. The processor 105 is also configured to be able to detect environmental data based on the communication engine 115. For example, the processor 105 can be configured to control various wireless engines or components to perform functions to obtain wireless neighbor information from nearby wireless devices. An illustrative example of obtaining wireless neighbor information comprises transmitting a beacon, such as a wireless probe (e.g., a WiFi 802.11k probe), to receive neighbor information. Neighbor information can include various qualities of the device such as available modes, access point information, wireless communication capabilities, and other pertinent information.

The processor 105 is configured to preprocess the environmental data and input the environmental data into the environment detection engine 112. In one aspect, the environment detection engine 112 is configured to analyze the environmental data to output information that identifies the context of the electronic device 100. For example, the environment detection engine 112 can identify that the environment 135 is a low ambient noise environment, such as a library having an ambient noise level of approximately 40 decibels (dB). In another example, the environment detection engine 112 identify that the environment 135 is a high ambient noise environment, such as a restaurant having an ambient noise level of approximately 70 dB.

In some aspects, the AI model is configured to discriminate against a combination of data sources and learn weights to apply to different layers based on a variety of environmental data to output the information that identifies the context of the electronic device 100. In some aspects, the environmental data comprises suggestive data that can possibly reveal pertinent information as luminance information related to a photosensor. In some cases, the luminance information can vary based on the location of the electronic device (e.g., whether the electronic device is stored in a pocket). The environment can also include objective data such as neighbor information provided by scanning nearby electronic devices. Various examples of information provided to the environment detection engine 112 and determinations that can be made by the environment detection engine 112 are described below with reference to FIG. 2 and FIG. 3.

The environment detection engine 112 can also be configured to receive multimedia data related to the environment. In some aspects, the environment detection engine 112 is configured to receive ambient audio information to facilitate the determination of the context. For example, the environment detection engine 112 can determine various properties and identify various properties on the ambient audio information that are relevant to identifying the context of the electronic device 100. For example, in cases where the environment detection engine 112 includes or implements an AI or ML model, the weights of the AI or ML model can be related to various determinations in the hidden layers of the AI or ML model such as the number of speakers, the distance from the speakers, and so forth. The environment detection engine 112 can also receive image data related to the environment to facilitate the determination of the context. Weights across the different hidden layers of the AI or ML model of the environment detection engine 112 may be trained to understand the variety of the environmental data and determine contextual information related to the environment. In one illustrative aspect, the contextual information related to the environment can include a noise floor based on the context corresponding to a high ambient noise environment or can include a noise ceiling based on the context corresponding to a low ambient noise environment.

The environment detection engine 112 is configured to combine the different types of environmental information and synthesize information to understand the context of the electronic device 100. For instance, the weights of the AI or ML model of the environment detection engine 112 may be trained to understand the various environmental data and determine contextual information related to the environment. In some cases, the output can be a data object that represents various aspects of the environment that can affect aural perception, and the data object can also represent various aspects relating to haptic feedback within the environment.

According to some aspects, the output of the environment detection engine 112 can vary and include a plurality of characteristics indicative of the environment. For example, the environment detection engine 112 can determine a noise ceiling (e.g., a maximum noise level) that is suitable for the low ambient noise environment for different functions associated with the electronic device 100. Illustrative examples of different functions of the electronic device 100 include multimedia content consumption, games, applications, and notifications configured to be output. The environment detection engine 112 can also determine a noise floor (e.g., a minimum noise level) that is suitable for the high ambient noise environment based on the different functions. The environment detection engine 112 can identify a context and configuration of haptic feedback based on the environmental data.

Based on the environment detection engine 112, the processor 105 is configured to determine to modify haptic feedback based on the context of the electronic device 100. The modification of the haptic feedback can occur in various manners. In one illustrative example, the processor 105 is configured to modify a setting within an application programming interface (API). For example, Table 1 below illustrates static constants that can be changed and Table 2 below illustrates public static and instance methods of the android.os.VibrationEffect namespace that can be initiated based on static constants from Table 1.

TABLE 1

| Type | Description |
|---|---|
| int | DEFAULT_AMPLITUDE: The default vibration strength of the device. |
| int | EFFECT_CLICK: A click effect. |
| int | EFFECT_DOUBLE_CLICK: A double click effect. |
| int | EFFECT_HEAVY_CLICK: A heavy click effect. |
| int | EFFECT_TICK: A tick effect. |

TABLE 2

| Method | Description |
|---|---|
| static VibrationEffect | createOneShot(long milliseconds, int amplitude) Create a one shot vibration. |
| static VibrationEffect | createPredefined(int effectId) Create a predefined vibration effect. |
| static VibrationEffect | createWaveform(long[ ] timings, int[ ] amplitudes, int repeat) Create a waveform vibration. |
| static VibrationEffect | createWaveform(long[ ] timings, int repeat) Create a waveform vibration, using only off/on transitions at the provided time intervals, and potentially repeating. |
| int | describeContents( ) Describe the kinds of special objects contained in this Parcelable instance's marshaled representation. |
| static VibrationEffect.Composition | startComposition( ) Start composing a haptic effect. |

In other aspects, the processor 105 can be configured to control the haptic based on a function that is being executed. For example, a web browser generally does not output haptic information due to the hardware controls being outside of the browser sandbox and therefore the execution of the web browser will not result in the output of haptic feedback. In another example, a game may be configured to output a significant quantity of haptic feedback and the processor 105 may need to adjust the haptic feedback to reduce noise associated with the haptic feedback. Based on the application or function being executed, the processor 105 may be configured to provide environmental data, either captured contemporaneously with a time period to ensure that the environmental data is relevant to the current environment, to the environment detection engine 112 and then determine whether to adjust haptic feedback based on the output of the environment detection engine 112.

In other aspects, the processor 105 may be configured to adjust notifications from various applications. For example, in a silent mode, the processor 105 may be configured to output haptic feedback to provide a notification of a new message (e.g., text or e-mail). Messages may quickly be received frequently which can cause the electronic device 100 to produce a significant amount of undesirable noise. In this case, the electronic device 100 can determine that the noise produced from notifications exceeds a threshold over a period of time (e.g., a power spectral density) and reduce haptic notifications from a portion of the applications causing the noise. In some cases, the reduction of the haptic notifications can be performed by reducing the strength of the notification, shortening the haptic feedback period, grouping notifications within a period of time (e.g., every 5 minutes), or disabling notifications from certain applications.

In some cases, the electronic device 100 may be configured to increase haptic feedback based on the context. For example, the environment detection engine 112 can determine that the context relates to a shared experience, such as a person consuming multimedia content from an application or playing a game while sharing this experience with at least one spectator. The environment detection engine 112 can output information that causes the electronic device 100 to increase haptic feedback to share the experience with the spectator. In other aspects, the electronic device 100 may increase the haptic feedback based on a shared location with a significant amount of noise, such as a sporting event.

The electronic device 100 may be configured to further train the AI or ML model based on the profile data and other information. In some aspects, various usage of the processor 105 may be recorded in a temporary storage location and then process various aspects of the data. In one illustrative aspect, the processor 105 may build the profile data 114, which can identify various aspects of the usage of the device, such as various events and parameters associated with those events. Parameters associated with events can include the time of the event, location information that identifies the location of the electronic device 100, a duration, and a source of the event, for example. Based on the various events and data recorded in the temporary storage locations, the processor 105 can execute a machine learning (ML) model to build a profile that identifies various information related to usage and application usage. In one illustrative aspect, the ML model can be a clustering algorithm that groups data across different dimensions (e.g., location, time, event source, etc.) and build the profile data 114.

In some aspects, the electronic device 100 may train the AI or ML model of the environment detection engine 112 based on the profile data 114 or the events in the temporary storage location, which causes the processor 105 to update the weights of the hidden layers within the AI or model. In some cases, federated learning may be used to train the AI or ML model of the environment detection engine 112. In some aspects, the adjustments to the weights can be correlated to a data source or data sources that are primarily responsible for the change in the weight. An illustrative example of a data source responsible for the change includes a time of an event and a location of an event. For example, a person may enable a silent mode (e.g., do not disturb) manually upon entry into a specific room at a particular time. In another illustrative example, the data source primarily responsible for the change of a weight can be the detection of a person turning in for the night. In some aspects, the weights of the AI model of the environment detection engine 112 are refined based on the data obtained by the electronic device 100, and this may be referred to as federated learning. In some cases, federated learning can also include sharing the refined weights and relevant anonymized data with the cloud system 120, which can then further revise the weights associated with the AI model of the environment detection engine 112 and provide an updated AI model or changes for the processor 105 to apply to the AI model.

Figure 2:
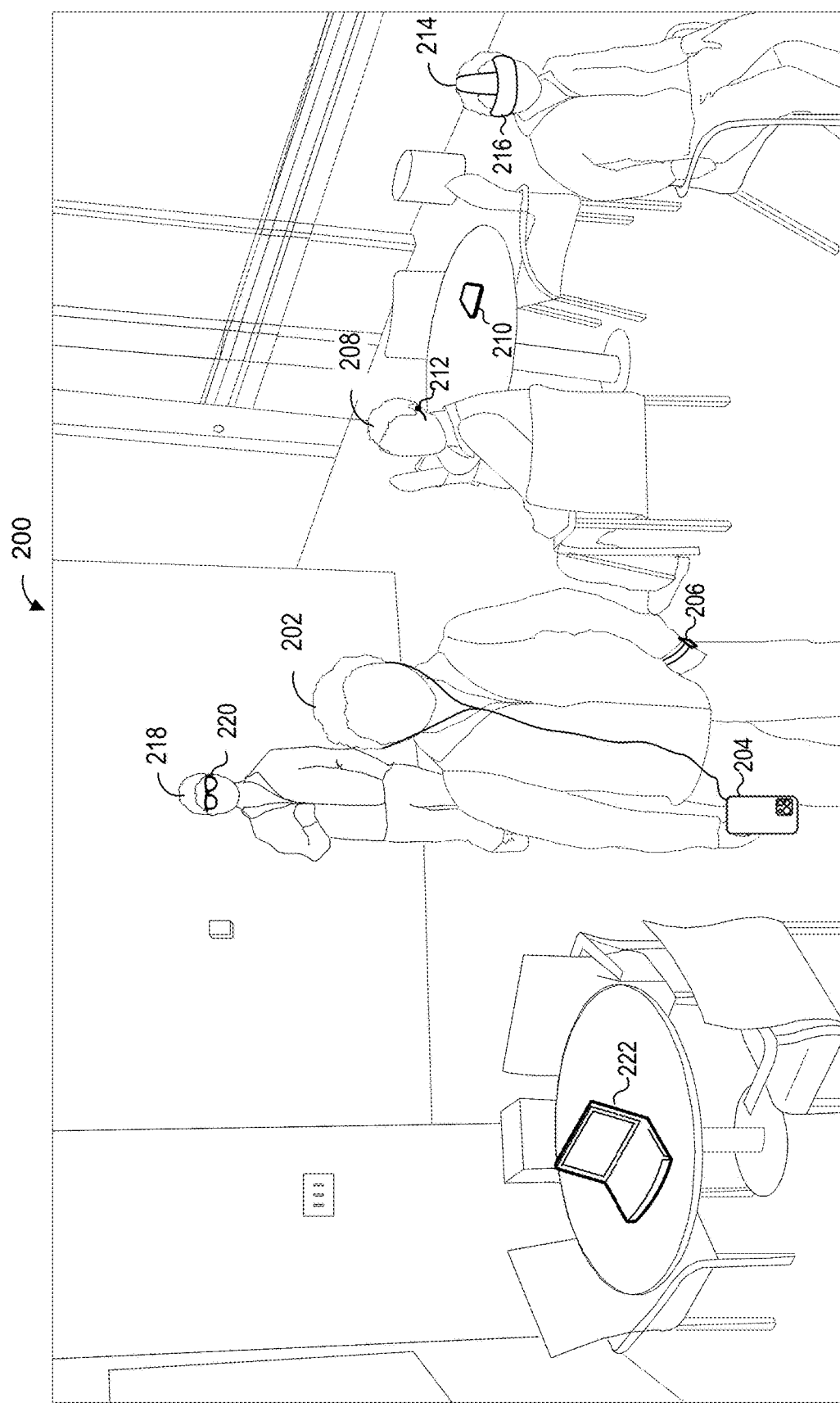
FIG. 2 is a conceptual diagram illustrating an example of an environment for an electronic device to determine a context and adjust haptic feedback in accordance with some aspects of the disclosure.

FIG. 2 is a conceptual diagram illustrating an example of an environment 200 for which an electronic device (e.g., the electronic device 100 of FIG. 1) to determine a context. Based on the context, the electronic device can adjust haptic feedback. In one illustrative aspect, the environment 200 is a low ambient noise environment with multiple people nearby having various electronic devices that can be used or detected by the electronic device to facilitate understanding of the environment. For example, the environment 200 can be a library or other space designated to minimize ambient noise. In one example, a first person 202 may have multiple devices such as a computing device 204, which the first person 202 is holding, and a wearable device 206, which the person is wearing. A second person 208 can have a computing device 210 that is placed on a table that is connected to true wireless stereo (TWS) earbuds 212 that the second person 208 is wearing. A third person 214 may be wearing an HMD 216 and engage with various functions that can be performed in extended reality (XR), and the third person 214 may have a computing device that is positioned in a location that is unperceivable by other people in the environment. A fourth person 218 may have an XR device 220 that is also connected to a computing device that is positioned in a location that is unperceivable by other people in the environment.

In some aspects, the first person 202, the second person 208, and the third person 214 may each engage in activity that causes various disruptions within the low ambient noise environment. In one illustrative example, the first person 202 may perform a multimedia function (e.g., a video, an application) that outputs haptic feedback on the computing device 204 to enhance the user experience. The first person 202 may be wearing earbuds that isolate the audio associated with the multimedia content and therefore cannot aurally perceive the haptic feedback produced by the computing device 204. In some aspects, the second person may be disrupted because the computing device 210 is placed on a rigid surface, which will cause the computing device 210 to produce a significant amount of noise while outputting the haptic feedback. By contrast, if the computing device 210 was placed in the second person's pocket, that same haptic feedback would not be perceivable by other people (including the second person).

The computing device 204 may be configured to use an environment detection engine (e.g., environment detection engine 112) to determine the context of environment 200. As noted above with respect, to FIG. 1, the environment detection engine may include or implement an AI or ML model or may utilize other techniques (e.g., computer vision such as object detection or other techniques) to determine the context of the environment 200. In some aspects, the environment detection engine (e.g., via the AI model, computer-vision techniques, etc.) can identify a shift in the context-based on environmental information such as noise. For example, the environment detection engine can detect that the first person 202 enters a library based on a significant shift in audio noise. In response to detecting the shift of the context, the computing device 204 can be configured to determine the context based on multiple sources of environmental information.

In one illustrative aspect, the computing device 204 can record ambient information using a microphone, capture at least one image using an image sensor, and detect the luminance of the environment using a photosensor. In one illustrative example, the computing device 204 can be held in the hand of the first person 202 and, when the computing device 204 detects the shift in the context, begins obtaining environmental information to identify a context. In the illustrative environment 200, the environment 200 includes a number of people and indicates daylight.

The computing device 204 can also use various wireless communication standards (e.g., Bluetooth™, 802.11 wireless standards, etc.) to detect other nearby devices. For example, the computing device 204 can send a wireless measurement request (e.g., a WiFi 802.11k measurement request) and receive a response from the wearable device 206, a computing device 210 of the second person 208, TWS earbuds 212 of the second person 208, an HMD that the third person 214 is wearing, an XR device 220 of the fourth person 218, and a laptop 222. The computing device 204 can also receive beacon responses from other devices that are not visible in the environment 200, such as an access point for providing wireless Internet service. A wireless measurement request (e.g., an 802.11k measurement request) solicits measurements from other devices. Examples of reports from neighboring devices in reply to a wireless measurement request include a beacon report, a frame report, a channel load report, a noise histogram report, a hidden node report, a medium sensing time histogram report, a wireless station statistics report, and location configuration information.

The computing device 204 can determine various information from the various measurement reports, such as identifying the nearest electronic devices based on the received signal strength information. In some cases, the computing device 204 can identify a property of the device that the computing device 204 can use to determine the context. For example, the computing device 204 can identify that the TWS earbuds 212 are wearable devices based on their power transmission profile. In other examples, the channel load report can provide information that indicates heavy channel usage across many different frequency bands, which can imply that the environment 200 is a high ambient noise environment.

The computing device 204 may also record audio using the microphone to determine the context. In some instances, the audio can be indicative of the context in combination with profile information. For example, audio information recorded by the computing device 204 indicating a low ambient noise can be combined with profile information to indicate that the context is a public setting in a shared space. In such an example, the computing device 204 can determine to reduce haptic feedback based on the determined context.

In other examples, the computing device 204 can also use profile information (e.g., profile data 114) that is obtained over time to identify patterns. In some aspects, an ML model can build the profile information by clustering instances of recorded data. For example, the ML model can identify the first person 202 plays games in short bursts during daylight hours, or the first person 202 plays games during a specific part of a day (e.g., before sleep, for short bursts when in a library). The ML model uses objective data such as time, application information, location, and day to build the profile information.

In another example, the computing device 204 can use federated learning techniques to improve the AI model of the environment detection engine used to detect the context of the environment 200 and receive updates to the AI model. An example of federated learning is further discussed herein with reference to FIG. 4.

Figure 3:
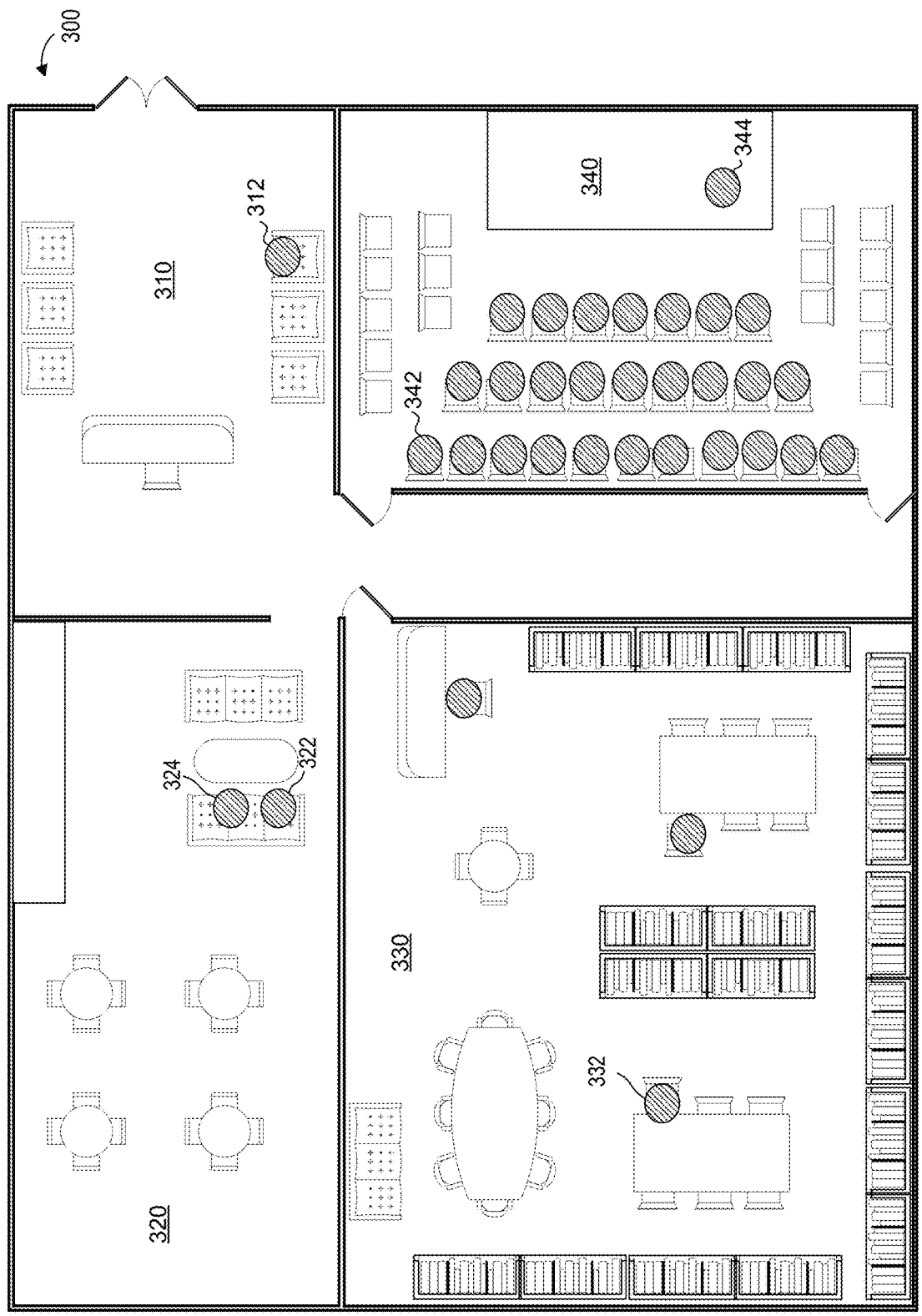
FIG. 3 illustrates a top view of an example environment in which an electronic device may determine different contexts and adjust haptic feedback in accordance with some aspects of the disclosure.

FIG. 3 illustrates a top view of an example environment 300 in which an electronic device may determine different contexts and adjust haptic feedback in accordance with some aspects of the disclosure. In one illustrative example, the environment 300 includes a reception area 310, a common area 320 (e.g., a kitchen, a lounge, etc.), a library 330, and a classroom 340. In accordance with some aspects, when a person 312 enters the reception area, an electronic device may detect a context shift based on entering the building. The ambient noise level of the reception area 310 may be approximately 60 dB based on conversations. In some aspects, if the person 312 plays a game on an electronics device having context-aware haptic feedback (e.g., the electronic device 100), the electronic device may determine that the context has an ambient noise level that does not require any change to haptic feedback.

In another example, a first person 322 and a second person 324 are in the common area and the first person 322 executes an application to present multimedia content with the second person 324 that is spectating. In this example, an electronics device of the first person 322 can obtain environmental information and identify the second person, luminance information indicating daylight, and ambient noise level indicating conversations of approximately 60 dB. The electronic device of the first person can provide the environmental information to an environment detection engine (e.g., the environment detection engine 112, which may include or implement an AI model, computer-vision techniques, and/or other techniques to determine context of the environment) and obtain information that identifies the context as sharing content in a shared space. Based on the identified context, the electronic device can increase the haptic feedback to enable the second person 324 to increase engagement in the shared experience.

A third person 332 may be studying in the library 330 and may take a break to play a multimedia game. An electronics device of the third person 332 can detect the context when the application is requested to execute or receives the focus and outputs a user interface to play the game. The electronics device of the third person 332 can obtain environmental information and identify luminance information indicating daylight, receive a photo indicating few people are near, and obtain information on ambient noise level corresponding to a whisper (e.g., approximately 40 dB). The electronics device of the third person 332 can provide the environmental information to the environment detection engine (e.g., the environment detection engine 112) and obtain information that identifies the context as a shared quiet space. Based on the identified context, the electronic device can decrease the haptic feedback associated with the multimedia game to reduce the noise produced by the electronic device.

A fourth person 342 may be attending a class in the classroom 340, with a primary speaker 344 that presents material to the class. In this instance, an electronics device of the fourth person 342 may detect a context shift upon entry into the classroom 340 or when a primary speaker 344 begins a lecture. In response to detecting the context shift, the computing device of the fourth person 342 may obtain environmental information related to the context and input the environmental information into the environment detection engine (e.g., the environment detection engine 112). In this case, the electronic device of the fourth person 342 can identify that a large number of computing devices (e.g., mobile devices or other devices) are near based on beacon reports as part of the environmental information. The electronics device of the fourth person 342 may also detect that the lights within the classroom 340 dim and luminance decreases. Based on the environmental information, the environment detection engine of the electronics device outputs contextual information and, in response, the electronics device reduces haptic feedback to prevent interrupting other people. In one aspect, the electronic device may delay haptic feedback from notifications or may reduce the intensity of the notifications.

Figure 4:
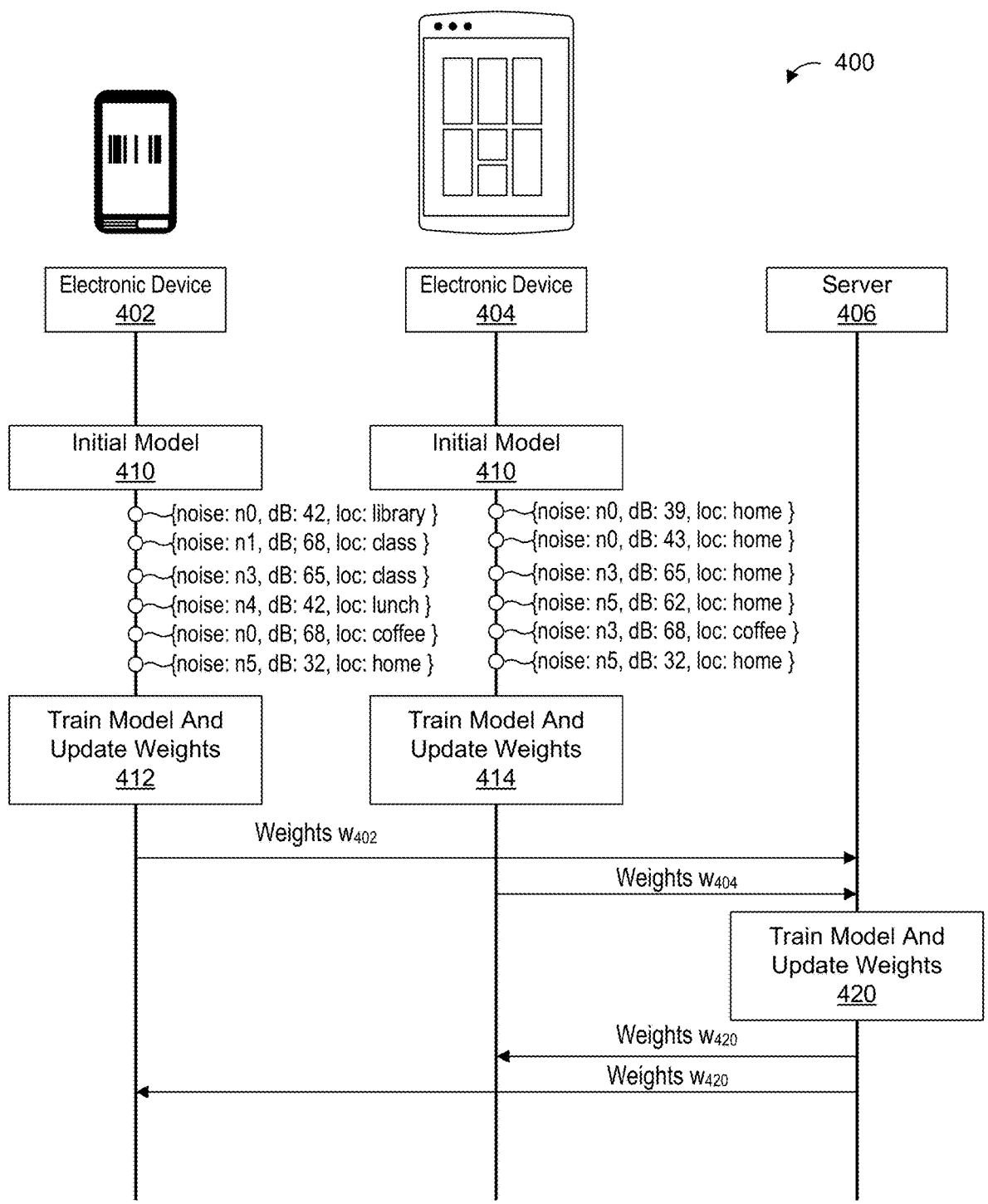
FIG. 4 illustrates a sequence diagram for training an AI model with a combination of on-device learning techniques and aggregate-based learning in accordance with some aspects of the disclosure.

FIG. 4 illustrates a sequence diagram 400 for training an AI model of the environment detection engine (e.g., the environment detection engine 112) with a combination of on-device learning techniques and aggregate-based learning in accordance with some aspects of the disclosure. In some aspects, sequence diagram 400 illustrates training a first electronic device 402 and a second electronic device 404. In the illustrative example, the first electronic device 402 and the second electronic device 404 may be owned by the same person to illustrate how different devices can receive different training weights based on usage, but the first electronic device 402 and the second electronic device 404 may be owned by different people in the same household or different households.

The first electronic device 402 and the second electronic device 404 include an initial model at block 410, and the model is trained based on initial training, and therefore the weights of the hidden layers are the same. For example, the model can be configured to detect the context of the electronic device and provide information related to aural output in that context. In one illustrative example, the model can identify a level of haptic feedback for that context. The model may also be configured to identify an audio level (e.g., a volume of the audio) suitable for that context. As the first electronic device 402 and the second electronic device 404 are used to monitor the environment, each device records data unique to its experience. For example, the first electronic device 402 identifies an ambient noise profile no with a volume of 42 dB and identifies a location. In some aspects, the location may be a data object that is represented as a string corresponding to the name of the location for clarity of description. The first electronic device 402 may record data into a temporary storage for later training of the model. The second electronic device 404 is presumed to be located in a different location, but experiences 3 dB less noise and is located at home.

Each of the first electronic device 402 and the second electronic device 404 capture data related to their usage or monitor their environment over a period of time and record the data illustrated in FIG. 4. The data recorded by the first electronic device 402 and the second electronic device 404 is depicted at similar times for purposes of clarity, and each of the first electronic device 402 and the second electronic device 404 can record different data at different times based on their different usage. For example, the second electronic device 404 may incur less use because it is located at home primarily.

At block 412, the first electronic device 402 may train the model and update the weights of the model based on the data illustrated in FIG. 4. In some aspects, certain trained aspects of the model may not be pertinent and the training and updating of the weights can refine the model based on the usage, either from the data recorded in FIG. 4 and/or from the profile data (e.g., profile data 114). The second electronic device 404 may also train the model and update weights at block 414. As the second electronic device 404 uses different data, the second electronic device 404 training will result in different weights.

In some cases, the first electronic device 402 can transmit weights $w_{402}$, which are the trained weights based on the experiences of the first electronic device 402, in a model update information to a server 406. The second electronic device 404 can also transmit weights $w_{404}$, which are the trained weights based on the experiences of the second electronic device 404, to a server 406. The model update information may also include data related to the weights, such as location and time. In some cases, any personal data is removed in this aspect because personalized information may be consumed within the on-device training (e.g., block 412 and block 414).

The server 406 is configured to receive weights for different devices that each have different experiences. Based on the updated weights and various information included in the model update information, the server 406 can train a model (to update the weights of the model) at block 420 based on the unique experiences of other user (and corresponding devices) to create an aggregated trained model having refined weights $w_{420}$. The server 406 can then transmit the refined weights wan to the first electronic device 402 and the second electronic device 404. Each of the first electronic device 402 and the second electronic device 404 can update their unique model based on the refined weights wan. In some cases, the model of the first electronic device 402 or the second electronic device 404 may be replaced.

As a result of a combination of on-device and aggregated weight training, the model may be trained based on a wide range of experiences that cannot be replicated based on a single training data set.

Figure 5:
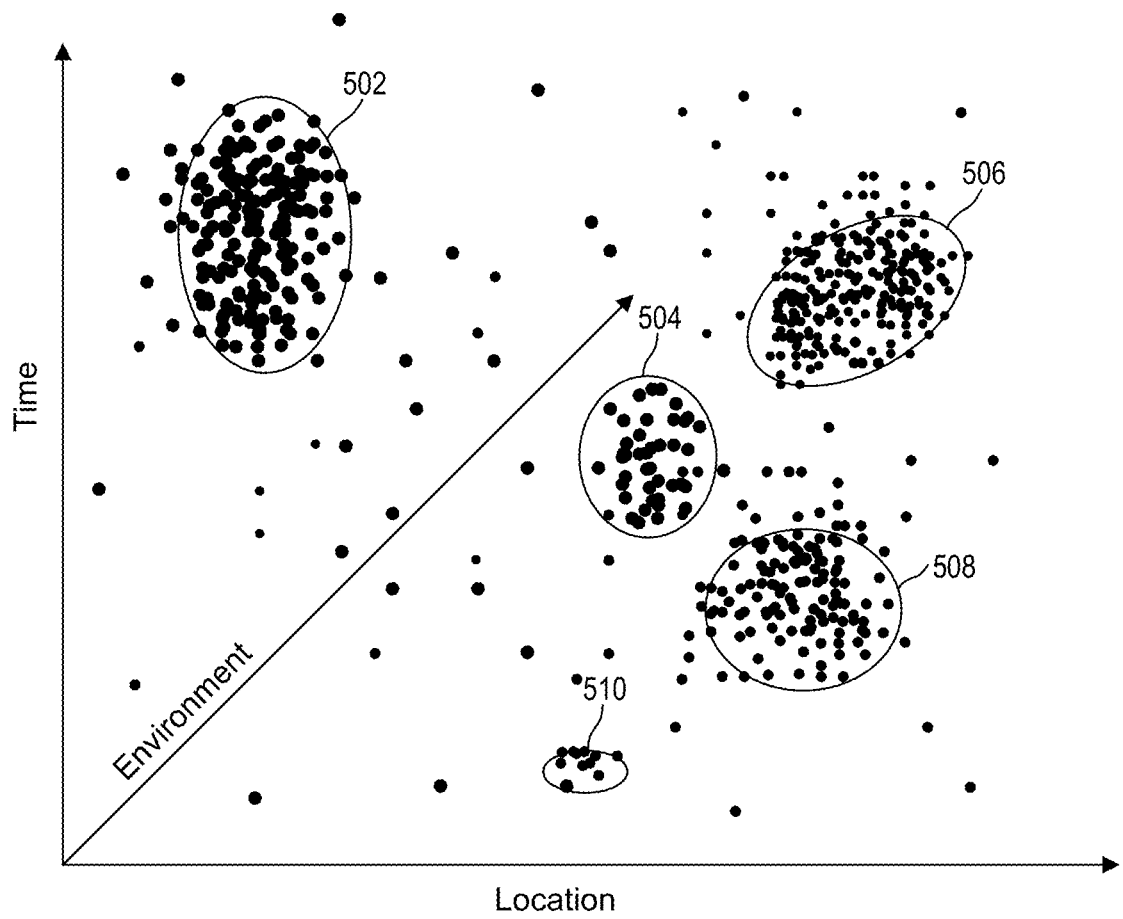
FIG. 5 is a three-dimensional (3D) graph that illustrates various data points provided by electronic devices that can be grouped to correspond a context in accordance with some aspects of the disclosure.

FIG. 5 is a three-dimensional (3D) graph that illustrates various data points provided by electronic devices that can be grouped to correspond a context in accordance with some aspects of the disclosure. In particular, the 3D graph illustrates various data points that a server (e.g., the server 406) can use to train and refine weights associated with an AI model. For purpose of clarity, the data points are displayed based on time, location, and environment (e.g., environmental data), but many more dimensions can be implemented. The environmental data can represent different sources of data such as audio, images, luminance, and neighbor wireless devices, for example.

The graph in FIG. 5 illustrated different groups that can be identified that are highly pertinent to training an AI model for determining an environmental context. For example, a first group 502 can be related to a shared environment with extensive noise (e.g., public transportation), group 504 may be a shared environment in a quiet environment, group 506 can be related to a private environment (e.g., home) at a particular time, group 508 can be related to a public space at a particular time within a particular geographic location, and group 510 can be a private space that is shared with specific noise requirements.

In some aspects, the AI model trained based on diverse data, for example from federated learning techniques, can provide accurate predictions based on environmental data. By collecting anonymous data from a rich set of experiences, the AI model can accurately be trained to accurately predict the context of the electronic device.

Figure 6:
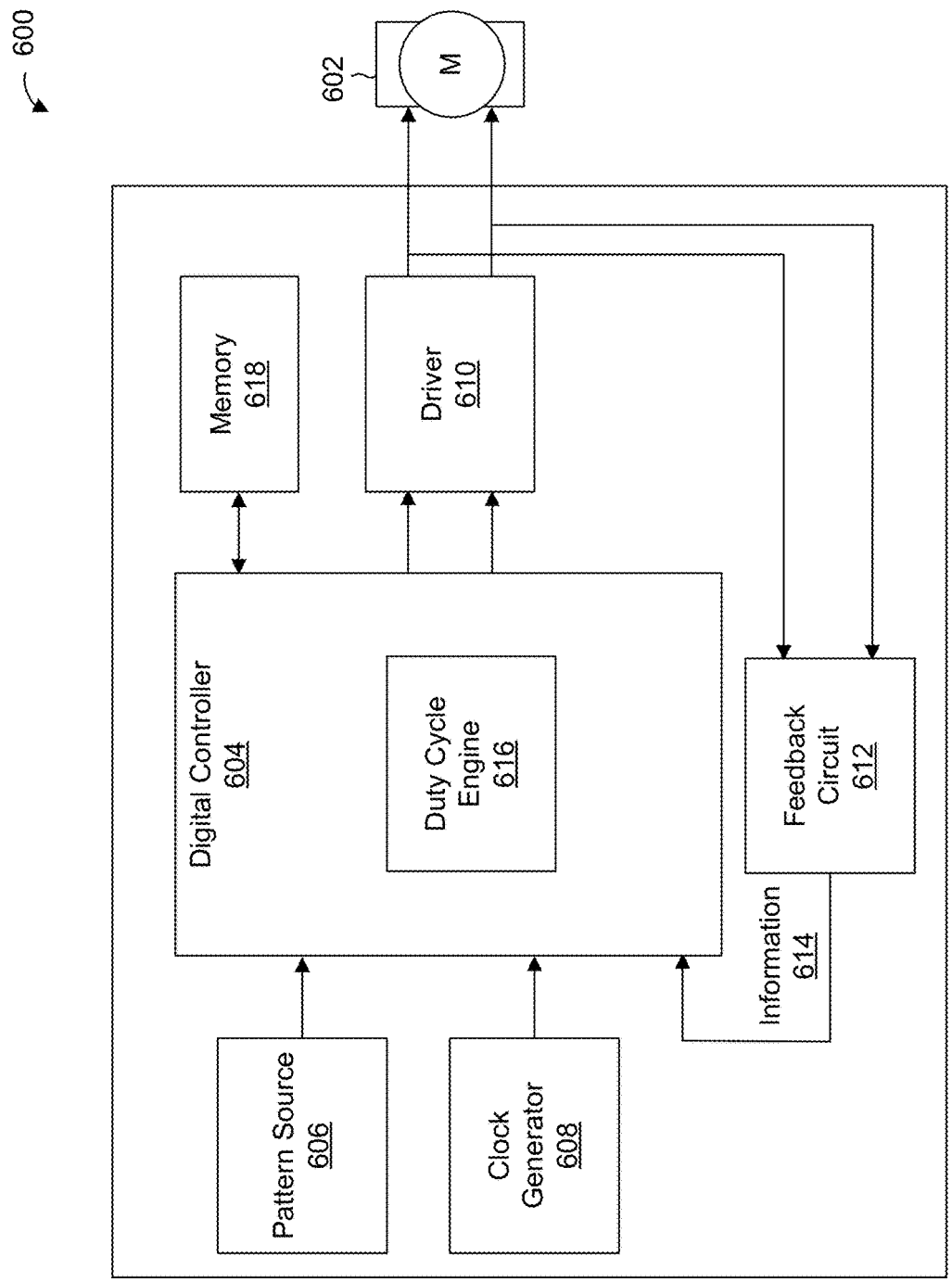
FIG. 6 is a block diagram illustrating a haptic driver for dynamically adapting the drive duty cycle of a haptic device in accordance with some aspects of the disclosure.

FIG. 6 is a block diagram illustrating a haptic driver for dynamically adapting the drive duty cycle of a haptic device 602 in accordance with some aspects of the disclosure. In FIG. 6, apparatus 600, which may comprise a haptic driver circuit, includes a digital controller 604 or other processor circuitry. In some aspects, the digital controller 604 receives amplitude information from a pattern source 606 and frequency information from a clock generator 608 and outputs signals that control a driver and power stage 610, which produces a pair of control signals that drive the haptic device 602. Apparatus 600 includes a feedback circuit 612, which produces information 614 about the phase (Φ) and amplitude (A) of the signals detected across the inputs to the haptic device 602, other information, or combinations thereof. The information 614 is used by the digital controller 604 to dynamically adjust the amplitude (or magnitude), period, duration, and/or duty cycle of the control signals. In some aspects, a duty cycle engine 616 controls vibrations produced by the haptic device 602 (e.g., by controlling the duty cycle of the haptic device 602). In some aspects, apparatus 600 may include a memory 618 communicatively coupled to the digital controller 604, for storing computer instructions, parameters, variables, etc. The specific components and connections shown in FIG. 6 are illustrative and not limiting.

Figure 7:
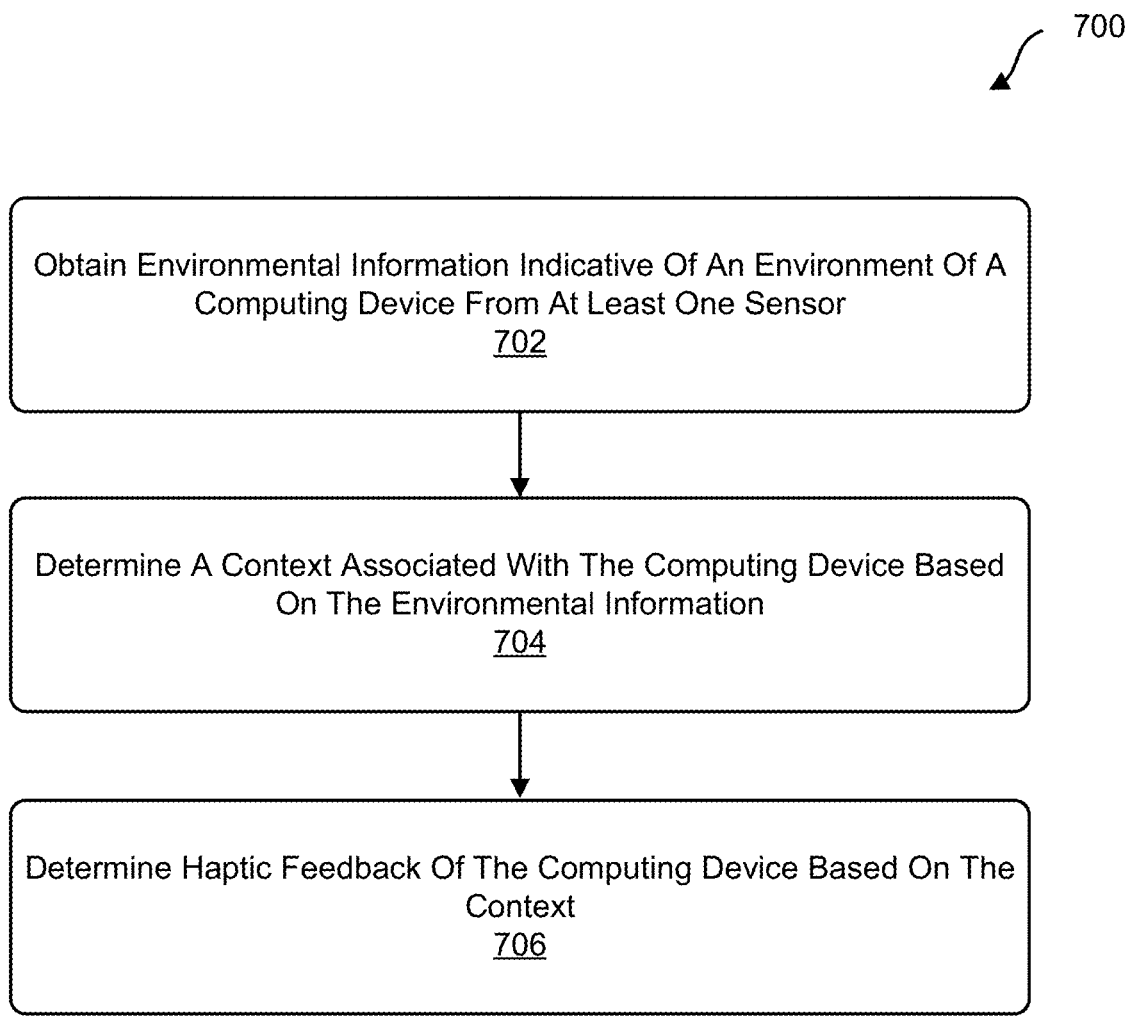
FIG. 7 is a flowchart illustrating an example of a method for controlling haptic feedback based on contextual awareness, in accordance with certain of the present disclosure.

FIG. 7 is a flowchart illustrating an example of a method 700 for controlling haptic feedback based on contextual awareness, in accordance with certain of the present disclosure. The method 700 can be performed by a computing device or apparatus (or a component thereof, such as a chipset, processor, etc.) including or in communication with at least one sensor. For instance, the computing device may include a mobile wireless communication device, a camera, an XR device, a wireless-enabled vehicle or a computing system or component of the vehicle, or other computing device. In one illustrative example, a computing system 1000 can be configured to perform all or part of the method 700.

At block 702, the computing device (or component thereof) may obtain environmental information indicative of an environment of the computing device from at least one sensor. At block 704, the computing device (or component thereof) may determine a context associated with the computing device based on the environmental information.

In some aspects, the environmental information includes ambient audio information of the environment, device information that identifies other wireless devices proximate to the computing device, luminance information, information indicating that at least one person has entered or exited the environment, at least one image, any combination thereof, and/or other information. In some cases, to determine the context, the computing device (or component thereof) may determine whether the ambient audio information is below a threshold for a period of time, determine a quantity of acoustic devices for outputting audio within a particular distance of the computing device, determine a spectral quality of the ambient audio information, determine a quantity of devices (e.g., mobile devices) that are within a particular distance of the computing device, determine a number of people that are within a particular distance of the computing device, any combination thereof, or perform one or more other operations based on the environmental information.

In some cases, to determine the context associated with the computing device based on the environmental, the computing device (or component thereof) may provide (e.g., output, transmit, or otherwise provide) the environmental information to a machine learning model for estimating a haptic feedback quantity associated with the environment.

In some aspects, the computing device (or component thereof) may obtain (e.g., receive, retrieve, determine, or otherwise obtain) a location of the computing device using a location sensor. In some cases, to determine the context associated with the computing device based on the environmental information, the computing device (or component thereof) may provide (e.g., output, transmit, or otherwise provide) the environmental information and the location of the computing device to a machine learning model for estimating an amount of noise associated with the environment.

At block 706, the computing device (or component thereof) may determine haptic feedback for output by the computing device based on the context. In some aspects, to determine the haptic feedback of the computing device based on the context, the computing device (or component thereof) may determine an amount of noise associated with the haptic feedback based on a surface in contact with the computing device. In some aspects, to determine the haptic feedback of the computing device based on the context, the computing device (or component thereof) may determine an amount of noise associated with haptic feedback that an application will emit during execution of the application. In some cases, the amount of noise associated with the haptic feedback that the application will emit is further based on at least one setting associated with the application.

In some aspects, the computing device (or component thereof) may identify applications that are configured to output notifications with haptic feedback. The computing device (or component thereof) may adjust haptic feedback associated with notifications of at least a portion of (e.g., one or more of) the applications.

In some aspects, the computing device (or component thereof) may determine a maximum noise level associated with the haptic feedback based on the context associated with the computing device. In such aspects, the computing device (or component thereof) may decrease the haptic feedback of the computing device to reduce noise associated with the haptic feedback to be less than the maximum noise level associated with the haptic feedback. Additionally or alternatively, un some aspects, the computing device (or component thereof) may determine a minimum noise level associated with the haptic feedback based on the context associated with the computing device. In such aspects, the computing device (or component thereof) may increase the haptic feedback of the computing device to increase noise associated with the haptic feedback to be more than the minimum noise level associated with the haptic feedback.

In some examples, the computing device (or component thereof) may adjust an audio volume output (e.g., increase or decrease the audio volume) of an audio device based on the context and the haptic feedback.

In some cases, the computing device (or component thereof) may, based on a determination of (e.g., after determining) the haptic feedback for output by the computing device based on the context, obtain additional environmental information from the least one sensor indicating a change associated with the environment of the computing device. The computing device (or component thereof) may determine a second context associated with the computing device based on the additional environmental information. The computing device (or component thereof) may further determine a second haptic feedback for output by the computing device based on the second context.

In some aspects, the computing device includes a plurality of feedback events. For example, the plurality of feedback events may include a first feedback event that includes activating one or more haptic actuators based on a first parameter of the haptic feedback. In one illustrative example, the first parameter of the haptic feedback is associated with a magnitude of the haptic feedback, a duty cycle of the haptic feedback, a duration of the haptic feedback, a period of the haptic feedback, any combination thereof, and/or other parameter. The plurality of feedback events may additionally or alternatively include a second feedback event that includes activating the one or more haptic actuators based on a second parameter of the haptic feedback. In one illustrative example, the second parameter of the haptic feedback is associated with preventing actuation of at least one haptic actuator of the one or more haptic actuators.

In some cases, the computing device (or component thereof) may modify the first parameter of the haptic feedback associated with the first feedback event based on the context and/or modify the second parameter of the haptic feedback associated with the second feedback event based on the context. For instance, different alerts may be associated with different applications. In one example, a first alert associated with a first action may be a buzz having a short duration (e.g., 0.5 seconds or other duration) and a second alert associated with a second action may be a buzz having a longer duration (e.g., 1 second or other duration longer than the short duration) and/or a stronger intensity. The computing device (or component thereof) may adjust the alerts differently based on the context. For example, the computing device (or component thereof) may maintain the first alert (with the short duration) based on the context and may disallow the second alert (e.g., prevent the second alert from being output) based on the context.

In some examples, the processes described herein (e.g., method 700, and/or other process described herein) may be performed by a computing device or apparatus. For instance, the method 700 can be performed by a computing device (e.g., electronic device 100 in FIG. 1) having a computing architecture of the computing system 1000 shown in FIG. 10. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the methods described herein, including the method 700. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of methods described herein. In some examples, the computing device may include a display, a network interface configured to communicate and/or receive the data, any combination thereof, and/or other component(s). The network interface may be configured to communicate and/or receive IP-based data or other type of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

The method 700 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the methods.

The method 700 and/or other methods or processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
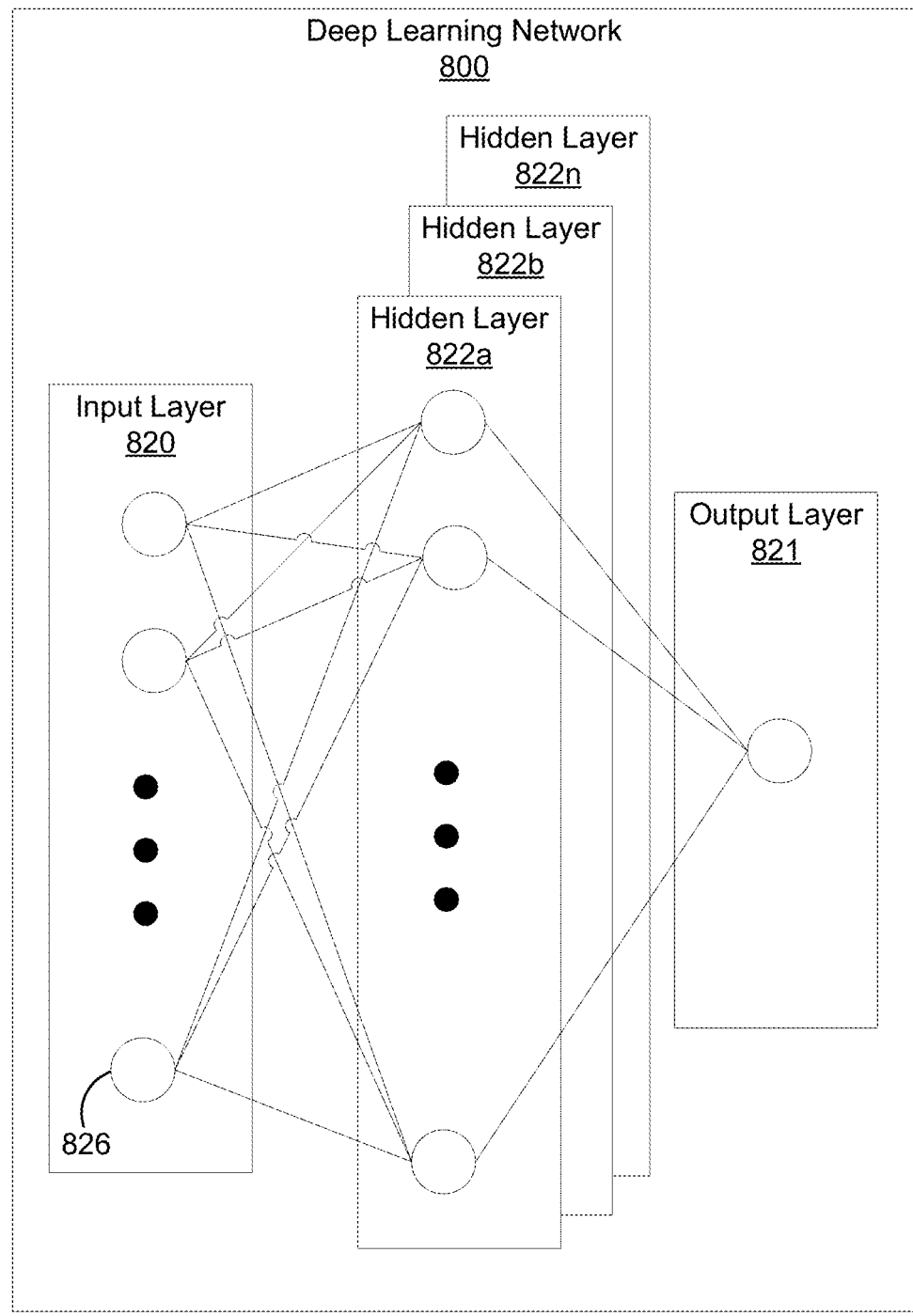
FIG. 8 is an illustrative example of a deep learning neural network that can be used to implement the machine learning-based alignment prediction, in accordance with aspects of the present disclosure.

As noted above, various aspects of the present disclosure can use machine learning models or systems. FIG. 8 is an illustrative example of a deep learning neural network 800 that can be used to implement the machine learning-based alignment prediction described above. An input layer 820 includes input data. In one illustrative example, the input layer 820 can include data representing the pixels of an input video frame. The neural network 800 includes multiple hidden layers 822a, 822b, through 822n. The hidden layers 822a, 822b, through 822n include "n" number of hidden layers, where "n" is an integer greater than or equal to one. The number of hidden layers can be made to include as many layers as needed for the given application. The neural network 800 further includes an output layer 821 that provides an output resulting from the processing performed by the hidden layers 822a, 822b, through 822n. In one illustrative example, the output layer 821 can provide a classification for an object in an input video frame. The classification can include a class identifying the type of activity (e.g., looking up, looking down, closing eyes, yawning, etc.).

The neural network 800 is a multi-layer neural network of interconnected nodes. Each node can represent a piece of information. Information associated with the nodes is shared among the different layers and each layer retains information as information is processed. In some cases, the neural network 800 can include a feed-forward network, in which case there are no feedback connections where outputs of the network are fed back into itself. In some cases, the neural network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the first hidden layer 822a can transform the information of each input node by applying activation functions to the input node information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 821, at which an output is provided. In some cases, while nodes (e.g., node 826) in the neural network 800 are shown as having multiple output lines, a node has a single output and all lines shown as being output from a node represent the same output value.

In some cases, each node or interconnection between nodes can have a weight that is a set of parameters derived from the training of the neural network 800. Once the neural network 800 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 820 using the different hidden layers 822a, 822b, through 822n in order to provide the output through the output layer 821. In an example in which the neural network 800 is used to identify features and/or objects in images, the neural network 800 can be trained using training data that includes both images and labels, as described above. For instance, training images can be input into the network, with each training frame having a label indicating the features in the images (for a feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 800 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 800 is trained well enough so that the weights of the layers are accurately tuned.

For the example of identifying features and/or objects in images, the forward pass can include passing a training image through the neural network 800. The weights are initially randomized before the neural network 800 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 1400, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1400 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as a risk function that corresponds to the expected value of the squared error loss and measures the quality of estimation provided by the neural network 1400.

The loss (or error) will be high for the first training images since the actual values will be much different than the predicted output. The goal of training is to minimize the amount of loss so that the predicted output is the same as the training label. The neural network 1400 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as, where w denotes a weight, $w_i$ denotes the initial weight, and η denotes a learning rate. The learning rate can be set to any suitable value, with a high learning rate including larger weight updates and a lower value indicating smaller weight updates.

The neural network 1400 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1400 can include any other deep network other than a CNN, such as an autoencoder, a deep belief nets (DBNs), a Recurrent Neural Networks (RNNs), among others.

Figure 9:
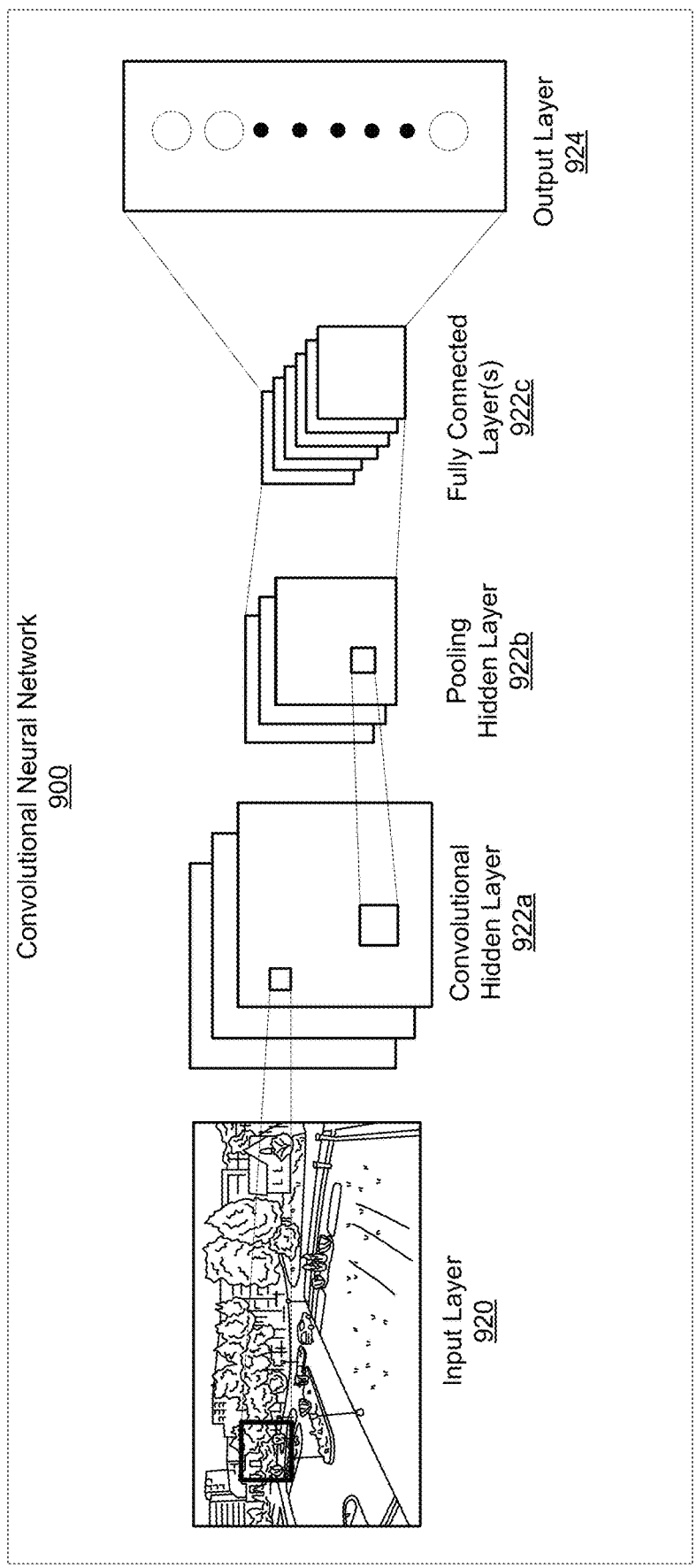
FIG. 9 is an illustrative example of a convolutional neural network (CNN), in accordance with aspects of the present disclosure.

FIG. 9 is an illustrative example of a CNN 900. The input layer 920 of the CNN 900 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 922a, an optional non-linear activation layer, a pooling hidden layer 922b, and fully connected hidden layers 922c to get an output at the output layer 924. While only one of each hidden layer is shown in FIG. 9, one of ordinary skill will appreciate that multiple convolutional hidden layers, non-linear layers, pooling hidden layers, and/or fully connected layers can be included in the CNN 900. As previously described, the output can indicate a single class of an object or can include a probability of classes that best describe the object in the image.

The first layer of the CNN 900 is the convolutional hidden layer 922a. The convolutional hidden layer 922a analyzes the image data of the input layer 920. Each node of the convolutional hidden layer 922a is connected to a region of nodes (pixels) of the input image called a receptive field. The convolutional hidden layer 922a can be considered as one or more filters (each filter corresponding to a different activation or feature map), with each convolutional iteration of a filter being a node or neuron of the convolutional hidden layer 922a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 922a. Each connection between a node and a receptive field for that node learns a weight and, in some cases, an overall bias such that each node learns to analyze its particular local receptive field in the input image. Each node of the hidden layer 922a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 922a is due to each node of the convolutional layer being applied to its corresponding receptive field. For example, a filter of the convolutional hidden layer 922a can begin in the top-left corner of the input image array and can convolve around the input image. As noted above, each convolutional iteration of the filter can be considered a node or neuron of the convolutional hidden layer 922a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 922a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 922a.

The mapping from the input layer to the convolutional hidden layer 922a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 922a can include several activation maps in order to identify multiple features in an image. The example shown in FIG. 9 includes three activation maps. Using three activation maps, the convolutional hidden layer 922a can detect three different kinds of features, with each feature being detectable across the entire image.

In some examples, a non-linear hidden layer can be applied after the convolutional hidden layer 922a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 900 without affecting the receptive fields of the convolutional hidden layer 922a.

The pooling hidden layer 922b can be applied after the convolutional hidden layer 922a (and after the non-linear hidden layer when used). The pooling hidden layer 922b is used to simplify the information in the output from the convolutional hidden layer 922a. For example, the pooling hidden layer 922b can take each activation map output from the convolutional hidden layer 922a and generates a condensed activation map (or feature map) using a pooling function. Max-pooling is one example of a function performed by a pooling hidden layer. Other forms of pooling functions be used by the pooling hidden layer 922a, such as average pooling, L2-norm pooling, or other suitable pooling functions. A pooling function (e.g., a max-pooling filter, an L2-norm filter, or other suitable pooling filter) is applied to each activation map included in the convolutional hidden layer 922a. In the example shown in FIG. 9, three pooling filters are used for the three activation maps in the convolutional hidden layer 922a.

In some examples, max-pooling can be used by applying a max-pooling filter (e.g., having a size of 2×2) with a stride (e.g., equal to a dimension of the filter, such as a stride of 2) to an activation map output from the convolutional hidden layer 922a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 922a having a dimension of 24×24 nodes, the output from the pooling hidden layer 922b will be an array of 18×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 900.

The final layer of connections in the network is a fully-connected layer that connects every node from the pooling hidden layer 922b to every one of the output nodes in the output layer 924. Using the example above, the input layer includes 28×28 nodes encoding the pixel intensities of the input image, the convolutional hidden layer 922a includes 3×24×24 hidden feature nodes based on application of a 5×5 local receptive field (for the filters) to three activation maps, and the pooling hidden layer 922b includes a layer of 3×12×12 hidden feature nodes based on application of max-pooling filter to 2×2 regions across each of the three feature maps. Extending this example, the output layer 924 can include ten output nodes. In such an example, every node of the 3×12×12 pooling hidden layer 922b is connected to every node of the output layer 924.

The fully connected layer 922c can obtain the output of the previous pooling hidden layer 922b (which should represent the activation maps of high-level features) and determines the features that most correlate to a particular class. For example, the fully connected layer 922c layer can determine the high-level features that most strongly correlate to a particular class, and can include weights (nodes) for the high-level features. A product can be computed between the weights of the fully connected layer 922c and the pooling hidden layer 922b to obtain probabilities for the different classes. For example, if the CNN 900 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 924 can include an M-dimensional vector (in the prior example, M=10). M indicates the number of classes that the CNN 900 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 10:
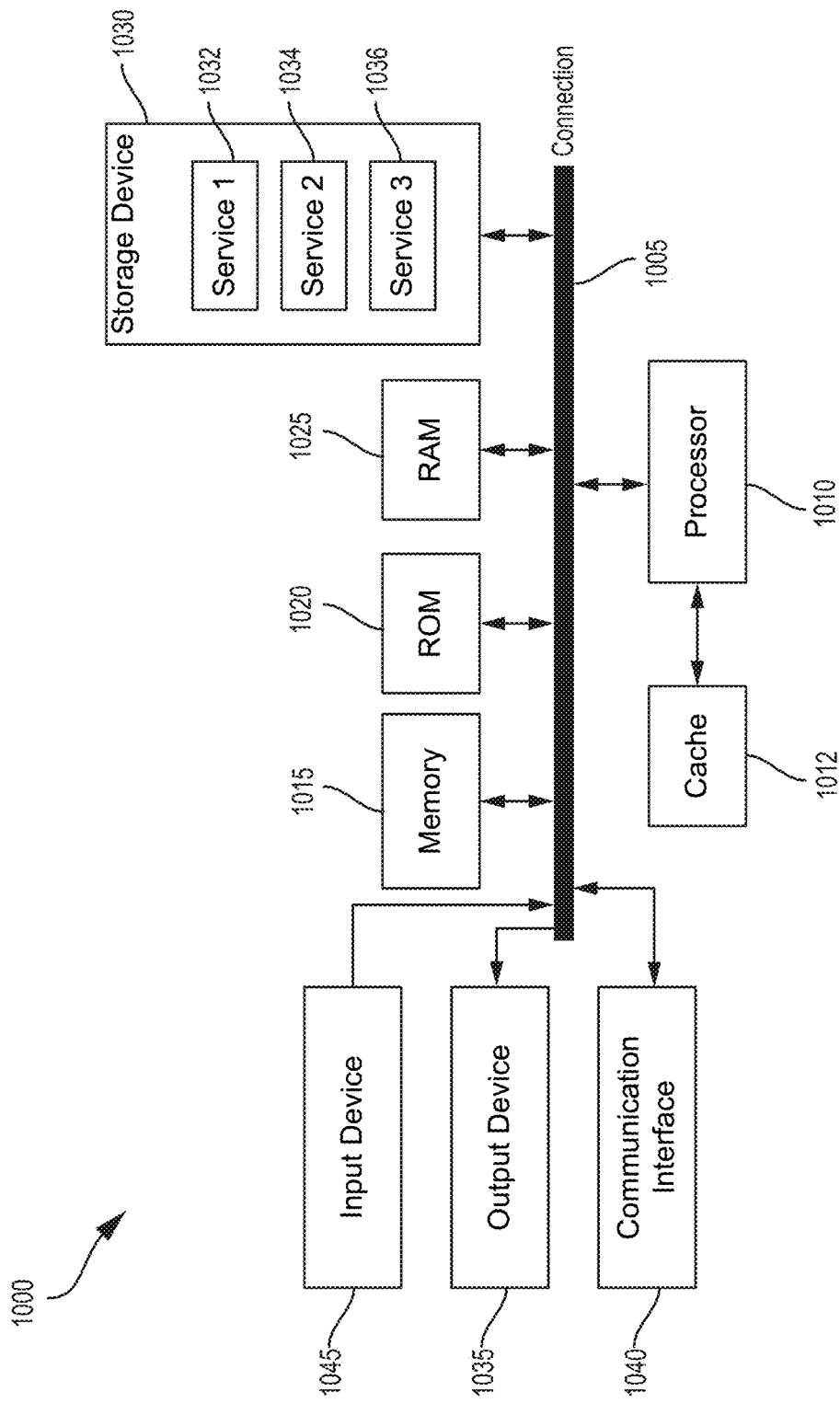
FIG. 10 is a diagram illustrating an example of a system for implementing certain aspects described herein.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some aspects, computing system 1000 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1000 includes at least one processing unit (CPU or processor) 1010 and connection 1005 that couples various system components including system memory 1015, such as read only memory (ROM) 1020 and read only memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1630 can include software services, servers, services, etc., that when the code that defines such software is executed by the processor 1610, it causes the system to perform a function. In some aspects, a hardware service that performs a particular function can include the software component stored in a computer-readable medium in connection with the necessary hardware components, such as processor 1610, connection 1605, output device 1635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to (" ") and greater than or equal to (" ") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for controlling haptic feedback, comprising: obtaining environmental information indicative of an environment of a computing device from at least one sensor; determining a context associated with the computing device based on the environmental information; and determining haptic feedback for output by the computing device based on the context.

Aspect 2: The method of Aspect 1, wherein determining the haptic feedback of the computing device based on the context comprises: determining an amount of noise associated with the haptic feedback based on a surface in contact with the computing device.

Aspect 3: The method of any of Aspects 1 to 2, wherein determining the haptic feedback of the computing device based on the context comprises: determining an amount of noise associated with haptic feedback that an application will emit during execution of the application.

Aspect 4: The method of any of Aspects 2 or 3, wherein the amount of noise associated with the haptic feedback that the application will emit is further based on at least one setting associated with the application.

Aspect 5: The method of any of Aspects 1 to 4, further comprising: identifying applications that are configured to output notifications with haptic feedback; and adjusting haptic feedback associated with notifications of at least a portion of the applications.

Aspect 6: The method of any of Aspects 1 to 5, wherein the environmental information comprises at least one of ambient audio information of the environment, device information that identifies other wireless devices proximate to the computing device, luminance information, information indicating that at least one person has entered or exited the environment, or at least one image.

Aspect 7: The method of Aspect 6, wherein determining the context comprises at least one of: determining whether the ambient audio information is below a threshold for a period of time; determining a quantity of acoustic devices for outputting audio within a particular distance of the computing device; determining a spectral quality of the ambient audio information; determining a quantity of computing devices that are within a particular distance of the computing device; or determining a number of people that are within a particular distance of the computing device.

Aspect 8: The method of any of Aspects 1 to 7, wherein determining the context associated with the computing device based on the environmental information comprises: providing the environmental information to a machine learning model for estimating a haptic feedback quantity associated with the environment.

Aspect 9: The method of any of Aspects 1 to 8, further comprising: obtaining a location of the computing device using a location sensor.

Aspect 10: The method of Aspect 9, wherein determining the context associated with the computing device based on the environmental information comprises: providing the environmental information and the location of the computing device to a machine learning model for estimating an amount of noise associated with the environment.

Aspect 11: The method of any of Aspects 1 to 10, further comprising: determining a maximum noise level associated with the haptic feedback based on the context associated with the computing device.

Aspect 12: The method of Aspect 11, further comprising: decreasing the haptic feedback of the computing device to reduce noise associated with the haptic feedback to be less than the maximum noise level associated with the haptic feedback.

Aspect 13: The method of any of Aspects 1 to 12, further comprising: determining a minimum noise level associated with the haptic feedback based on the context associated with the computing device.

Aspect 14: The method of Aspect 13, further comprising: increasing the haptic feedback of the computing device to increase noise associated with the haptic feedback to be more than the minimum noise level associated with the haptic feedback.

Aspect 15: The method of any of Aspects 1 to 14, further comprising: adjusting an audio volume output of an audio device based on the context and the haptic feedback.

Aspect 16: The method of any of Aspects 1 to 15, further comprising: after determining the haptic feedback for output by the computing device based on the context, obtaining additional environmental information from the least one sensor indicating a change associated with the environment of the computing device; determining a second context associated with the computing device based on the additional environmental information; and determining a second haptic feedback for output by the computing device based on the second context.

Aspect 17: The method of any of Aspects 1 to 16, wherein the computing device includes a plurality of feedback events, wherein a first feedback event of the plurality of feedback events comprises activating one or more haptic actuators based on a first parameter of the haptic feedback, and wherein a second feedback event of the plurality of feedback events comprises activating the one or more haptic actuators based on a second parameter of the haptic feedback.

Aspect 18: The method of Aspect 17, further comprising at least one of: modifying the first parameter of the haptic feedback associated with the first feedback event based on the context; or modifying the second parameter of the haptic feedback associated with the second feedback event based on the context.

Aspect 19: The method of any of Aspects 17 or 18, wherein the first parameter of the haptic feedback is associated with at least one of a magnitude of the haptic feedback, a duty cycle of the haptic feedback, a duration of the haptic feedback, or a period of the haptic feedback.

Aspect 20: The method of any of Aspects 17 to 19, wherein the second parameter of the haptic feedback is associated with preventing actuation of at least one haptic actuator of the one or more haptic actuators.

Aspect 21: An apparatus for controlling haptic feedback, comprising at least one memory and at least one processor (e.g., implemented in circuitry) coupled to the at least one memory. The at least one processor is configured to: obtain environmental information indicative of an environment of the apparatus from at least one sensor; determine a context associated with the apparatus based on the environmental information; and determine haptic feedback for output by the apparatus based on the context.

Aspect 22: The apparatus of Aspect 21, wherein, to determine the haptic feedback of the apparatus based on the context, the at least one processor is configured to: determine an amount of noise associated with the haptic feedback based on a surface in contact with the apparatus.

Aspect 23: The apparatus of any of Aspects 21 or 22, wherein, to determine the haptic feedback of the apparatus based on the context, the at least one processor is configured to: determine an amount of noise associated with haptic feedback that an application will emit during execution of the application.

Aspect 24: The apparatus of any of Aspects 22 or 23, wherein the amount of noise associated with the haptic feedback that the application will emit is further based on at least one setting associated with the application.

Aspect 25: The apparatus of any of Aspects 21 to 24, wherein the at least one processor is configured to: identify applications that are configured to output notifications with haptic feedback; and adjust haptic feedback associated with notifications of at least a portion of the applications.

Aspect 26: The apparatus of any of Aspects 21 to 25, wherein the environmental information comprises at least one of ambient audio information of the environment, device information that identifies other wireless devices proximate to the apparatus, luminance information, information indicating that at least one person has entered or exited the environment, or at least one image.

Aspect 27: The apparatus of Aspect 26, wherein, to determine the context, the at least one processor is configured to at least one of: determine whether the ambient audio information is below a threshold for a period of time; determine a quantity of acoustic devices for outputting audio within a particular distance of the apparatus; determine a spectral quality of the ambient audio information; determine a quantity of computing devices that are within a particular distance of the apparatus; or determine a number of people that are within a particular distance of the apparatus.

Aspect 28: The apparatus of any of Aspects 21 to 27, wherein the at least one processor is configured to: provide the environmental information to a machine learning model for estimating a haptic feedback quantity associated with the environment.

Aspect 29: The apparatus of any of Aspects 21 to 28, wherein the at least one processor is configured to: obtain a location of the apparatus using a location sensor.

Aspect 30: The apparatus of Aspect 29, wherein, to determine the context associated with the apparatus based on the environmental information, the at least one processor is configured to: provide the environmental information and the location of the apparatus to a machine learning model for estimating an amount of noise associated with the environment.

Aspect 31: The apparatus of any of Aspects 21 to 30, wherein the at least one processor is configured to: determine a maximum noise level associated with the haptic feedback based on the context associated with the apparatus.

Aspect 32: The apparatus of Aspect 31, wherein the at least one processor is configured to decrease the haptic feedback of the apparatus to reduce noise associated with the haptic feedback to be less than the maximum noise level associated with the haptic feedback.

Aspect 33: The apparatus of any of Aspects 21 to 32, wherein the at least one processor is configured to: determine a minimum noise level associated with the haptic feedback based on the context associated with the apparatus.

Aspect 34: The apparatus of Aspect 33, the at least one processor is configured to increase the haptic feedback of the apparatus to increase noise associated with the haptic feedback to be more than the minimum noise level associated with the haptic feedback.

Aspect 35: The apparatus of any of Aspects 21 to 34, wherein the at least one processor is configured to: adjust an audio volume output of an audio device based on the context and the haptic feedback.

Aspect 36: The apparatus of any of Aspects 21 to 35, wherein the at least one processor is configured to: based on a determination of the haptic feedback for output by the apparatus based on the context, obtain additional environmental information from the least one sensor indicating a change associated with the environment of the apparatus; determine a second context associated with the apparatus based on the additional environmental information; and determine a second haptic feedback for output by the apparatus based on the second context.

Aspect 37: The apparatus of any of Aspects 21 to 36, wherein the apparatus includes a plurality of feedback events, wherein a first feedback event of the plurality of feedback events comprises activating one or more haptic actuators based on a first parameter of the haptic feedback, and wherein a second feedback event of the plurality of feedback events comprises activating the one or more haptic actuators based on a second parameter of the haptic feedback.

Aspect 38: The apparatus of Aspect 37, wherein the at least one processor is configured to: modify the first parameter of the haptic feedback associated with the first feedback event based on the context; or modify the second parameter of the haptic feedback associated with the second feedback event based on the context.

Aspect 39: The apparatus of any of Aspects 37 or 38, wherein the first parameter of the haptic feedback is associated with at least one of a magnitude of the haptic feedback, a duty cycle of the haptic feedback, a duration of the haptic feedback, or a period of the haptic feedback.

Aspect 40: The apparatus of any of Aspects 37 to 39, wherein the second parameter of the haptic feedback is associated with preventing actuation of at least one haptic actuator of the one or more haptic actuators.

Aspect 41: The apparatus of any of Aspects 21 to 38, wherein the apparatus is a computing device.

Aspect 42: A non-transitory computer-readable medium having stored thereon instructions that, when executed by one or more processors, cause the one or more processors to perform operations according to any of Aspects 1 to 41.

Aspect 43: An apparatus for controlling haptic feedback, comprising one or more means for performing operations according to any of Aspects 1 to 41.

What is claimed is:

1. An apparatus for controlling haptic feedback, the apparatus comprising:
   at least one memory; and
   at least one processor coupled to the at least one memory and configured to:

obtain environmental information indicative of an environment of the apparatus from at least one sensor, wherein the environmental information comprises at least one of ambient audio information of the environment, device information that identifies other wireless devices proximate to the apparatus, luminance information, information indicating that at least one person has entered or exited the environment, or image data;
determine a context associated with the apparatus based on the environmental information; and
determine haptic feedback for output by the apparatus based on the context.

2. The apparatus of claim 1, wherein, to determine the haptic feedback of the apparatus based on the context, the at least one processor is configured to:
determine an amount of noise associated with the haptic feedback based on a surface in contact with the apparatus.

3. The apparatus of claim 1, wherein, to determine the haptic feedback of the apparatus based on the context, the at least one processor is configured to:
determine an amount of noise associated with haptic feedback that an application will emit during execution of the application.

4. The apparatus of claim 3, wherein the amount of noise associated with the haptic feedback that the application will emit is further based on at least one setting associated with the application.

5. The apparatus of claim 1, wherein the at least one processor is configured to:
identify applications that are configured to output notifications with haptic feedback; and
adjust haptic feedback associated with notifications of at least a portion of the applications.

6. The apparatus of claim 1, wherein, to determine the context, the at least one processor is configured to at least one of:
determine whether the ambient audio information is below a threshold for a period of time;
determine a quantity of acoustic devices for outputting audio within a particular distance of the apparatus;
determine a spectral quality of the ambient audio information;
determine a quantity of computing devices that are within a particular distance of the apparatus; or
determine a number of people that are within a particular distance of the apparatus.

7. The apparatus of claim 1, wherein the at least one processor is configured to:
obtain a location of the apparatus using a location sensor.

8. The apparatus of claim 1, wherein the at least one processor is configured to:
determine a maximum noise level associated with the haptic feedback based on the context associated with the apparatus.

9. The apparatus of claim 8, wherein the at least one processor is configured to decrease the haptic feedback of the apparatus to reduce noise associated with the haptic feedback to be less than the maximum noise level associated with the haptic feedback.

10. The apparatus of claim 1, wherein the at least one processor is configured to:
determine a minimum noise level associated with the haptic feedback based on the context associated with the apparatus.

11. The apparatus of claim 10, wherein the at least one processor is configured to increase the haptic feedback of the apparatus to increase noise associated with the haptic feedback to be more than the minimum noise level associated with the haptic feedback.

12. The apparatus of claim 1, wherein the at least one processor is configured to:
adjust an audio volume output of an audio device based on the context and the haptic feedback.

13. The apparatus of claim 1, wherein the at least one processor is configured to:
based on a determination of the haptic feedback for output by the apparatus based on the context, obtain additional environmental information from the at least one sensor indicating a change associated with the environment of the apparatus;
determine a second context associated with the apparatus based on the additional environmental information; and
determine a second haptic feedback for output by the apparatus based on the second context.

14. The apparatus of claim 1, wherein the apparatus includes a plurality of feedback events, wherein a first feedback event of the plurality of feedback events comprises activating one or more haptic actuators based on a first parameter of the haptic feedback, and wherein a second feedback event of the plurality of feedback events comprises activating the one or more haptic actuators based on a second parameter of the haptic feedback.

15. The apparatus of claim 14, wherein the at least one processor is configured to at least one of:
modify the first parameter of the haptic feedback associated with the first feedback event based on the context; or
modify the second parameter of the haptic feedback associated with the second feedback event based on the context.

16. The apparatus of claim 14, wherein the first parameter of the haptic feedback is associated with at least one of a magnitude of the haptic feedback, a duty cycle of the haptic feedback, a duration of the haptic feedback, or a period of the haptic feedback.

17. The apparatus of claim 14, wherein the second parameter of the haptic feedback is associated with preventing actuation of at least one haptic actuator of the one or more haptic actuators.

18. The apparatus of claim 1, wherein the apparatus is a mobile device.

19. The apparatus of claim 1, wherein the image data is an image.

20. A method for controlling haptic feedback, comprising:
obtaining environmental information indicative of an environment of a computing device from at least one sensor, wherein the environmental information comprises at least one of ambient audio information of the environment, device information that identifies other wireless devices proximate to the computing device, luminance information, information indicating that at least one person has entered or exited the environment, or image data;
determining a context associated with the computing device based on the environmental information; and
determining haptic feedback for output by the computing device based on the context.

21. The method of claim 20, wherein determining the haptic feedback of the computing device based on the context comprises:

determining an amount of noise associated with the haptic feedback based on a surface in contact with the computing device.

22. The method of claim 20, wherein determining the haptic feedback of the computing device based on the context comprises:
determining an amount of noise associated with haptic feedback that an application will emit during execution of the application.

23. The method of claim 20, further comprising:
identifying applications that are configured to output notifications with haptic feedback; and
adjusting haptic feedback associated with notifications of at least a portion of the applications.

24. The method of claim 20, wherein determining the context comprises at least one of:
determining whether the ambient audio information is below a threshold for a period of time;
determining a quantity of acoustic devices for outputting audio within a particular distance of the computing device;
determining a spectral quality of the ambient audio information;
determining a quantity of computing devices that are within a particular distance of the computing device; or
determining a number of people that are within a particular distance of the computing device.

25. The method of claim 20, further comprising:
determining a maximum noise level associated with the haptic feedback based on the context associated with the computing device; and
decreasing the haptic feedback of the computing device to reduce noise associated with the haptic feedback to be less than the maximum noise level associated with the haptic feedback.

26. The method of claim 20, further comprising:
determining a minimum noise level associated with the haptic feedback based on the context associated with the computing device; and
increasing the haptic feedback of the computing device to increase noise associated with the haptic feedback to be more than the minimum noise level associated with the haptic feedback.

27. The method of claim 20, further comprising:
adjusting an audio volume output of an audio device based on the context and the haptic feedback.

28. The method of claim 20, further comprising:
after determining the haptic feedback for output by the computing device based on the context, obtaining additional environmental information from the at least one sensor indicating a change associated with the environment of the computing device;
determining a second context associated with the computing device based on the additional environmental information; and
determining a second haptic feedback for output by the computing device based on the second context.

29. The method of claim 20, wherein the computing device includes a plurality of feedback events, wherein a first feedback event of the plurality of feedback events comprises activating one or more haptic actuators based on a first parameter of the haptic feedback, and wherein a second feedback event of the plurality of feedback events comprises activating the one or more haptic actuators based on a second parameter of the haptic feedback.

30. The method of claim 20, wherein the image data is an image.

* * * * *